US012609823B1

(12) United States Patent　　　(10) Patent No.:　US 12,609,823 B1

Cicinskas et al.　　　　　　　　　　(45) Date of Patent:　Apr. 21, 2026

---

(54) TERMINAL ACCESS TO VIRTUAL PRIVATE SERVERS WITH AUTOMATIC PROTOCOL FALLBACK

(71) Applicant: HOSTINGER operations, UAB, Vilnius (LT)

(72) Inventors: Algirdas Cicinskas, Kaunas (LT); Merkys Maliukevicius, Kaunas (LT)

(73) Assignee: HOSTINGER operations, UAB, Vilnius (LT)

( * ) Notice: Subject to any disclaimer, the term of this patent is extended or adjusted under 35 U.S.C. 154(b) by 0 days.

(21) Appl. No.: 19/255,117

(22) Filed: Jun. 30, 2025

Related U.S. Application Data

(63) Continuation of application No. 19/086,600, filed on Mar. 21, 2025.

(51) Int. Cl.
　　*H04L 29/06*　　　(2006.01)
　　*H04L 9/14*　　　(2006.01)
　　*H04L 9/30*　　　(2006.01)

(52) U.S. Cl.
　　CPC . *H04L 9/14* (2013.01); *H04L 9/30* (2013.01)

(58) Field of Classification Search
　　CPC ......... H04L 9/14; H04L 9/30; H04L 12/4641; H04L 45/76; H04L 63/0272; H04L 2012/5621; H04M 2207/35; H04N 21/4437; H04N 1/0035; G05B 2219/31198; G05B 2219/21094; G05B 2219/25133; G06F 11/1484; G06F 11/301; G06F 2009/45575; G06F 2009/45587; G06F 2201/815; Y10S 379/901; H04W 12/50; H04Q 2213/13036

See application file for complete search history.

(56) References Cited

U.S. PATENT DOCUMENTS 10,382,401　B1 *　8/2019　Lee ....................... H04L 63/166
2007/0300221　A1 *　12/2007　Hartz ................... G06F 3/1288
　　　　　　　　　　　　　　　　　　　718/1
2022/0174493　A1 *　6/2022　Elsins ................. H04L 12/2834

FOREIGN PATENT DOCUMENTS

KR　　　　　102063910　B1 *　1/2020　......... H04L 12/4641

* cited by examiner

*Primary Examiner* — Joseph P Hirl
*Assistant Examiner* — Leynna Truvan
(74) *Attorney, Agent, or Firm* — Young Basile Hanlon & MacFarlane, P.C.

(57)　　　　　　　　ABSTRACT

A request to access a Virtual Private Server (VPS) is receive from a client device. An attempt is made to establish a Secure Shell (SSH) connection with the VPS. Responsive to a failure to establish the SSH connection, a serial console connection is automatically established with the VPS. Data communicated via the serial console connection is converted to a format compatible with the request. The converted data is then provided to the client device.

20 Claims, 9 Drawing Sheets

100

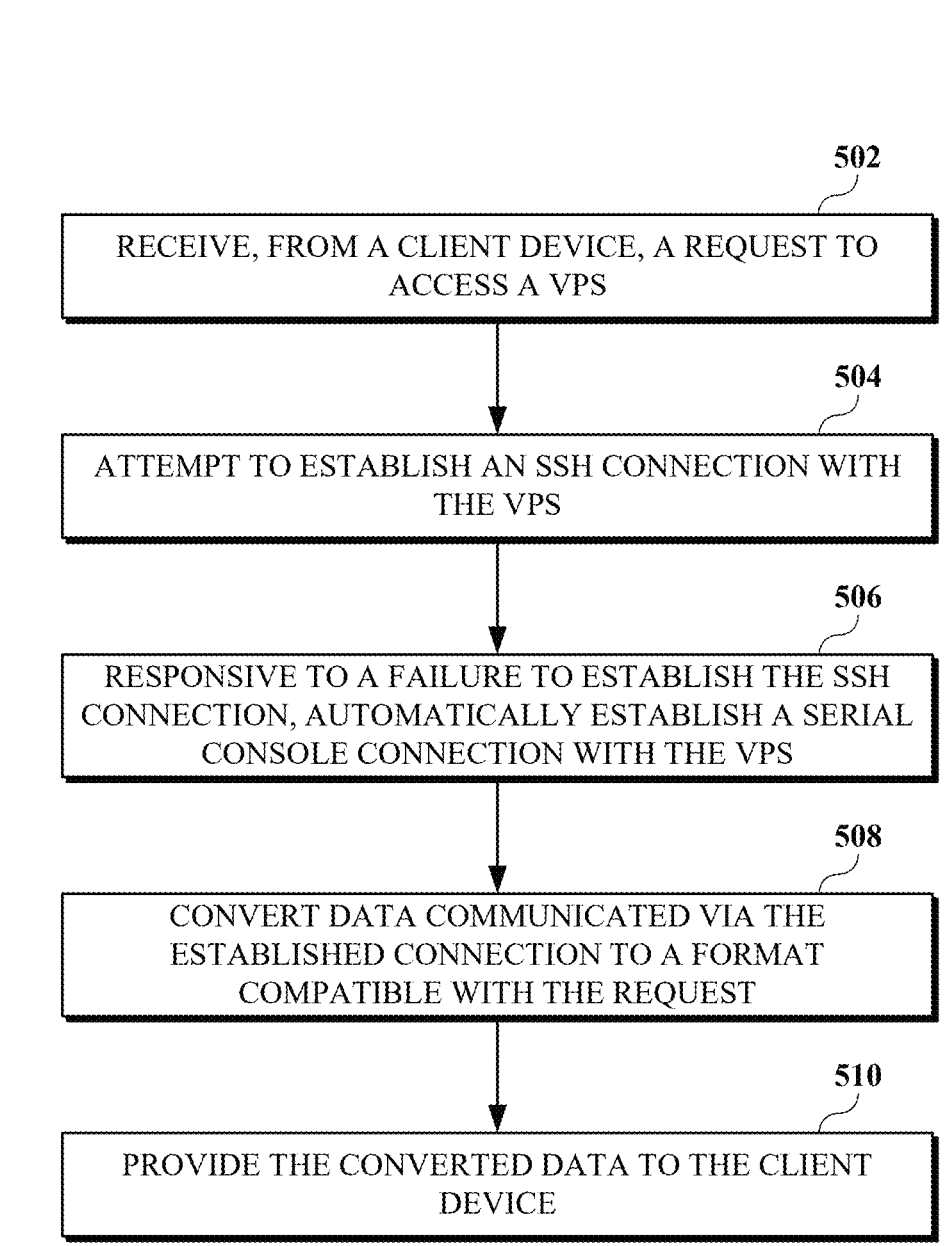

500

502

RECEIVE, FROM A CLIENT DEVICE, A REQUEST TO ACCESS A VPS

504

ATTEMPT TO ESTABLISH AN SSH CONNECTION WITH THE VPS

506

RESPONSIVE TO A FAILURE TO ESTABLISH THE SSH CONNECTION, AUTOMATICALLY ESTABLISH A SERIAL CONSOLE CONNECTION WITH THE VPS

508

CONVERT DATA COMMUNICATED VIA THE ESTABLISHED CONNECTION TO A FORMAT COMPATIBLE WITH THE REQUEST

510

PROVIDE THE CONVERTED DATA TO THE CLIENT DEVICE

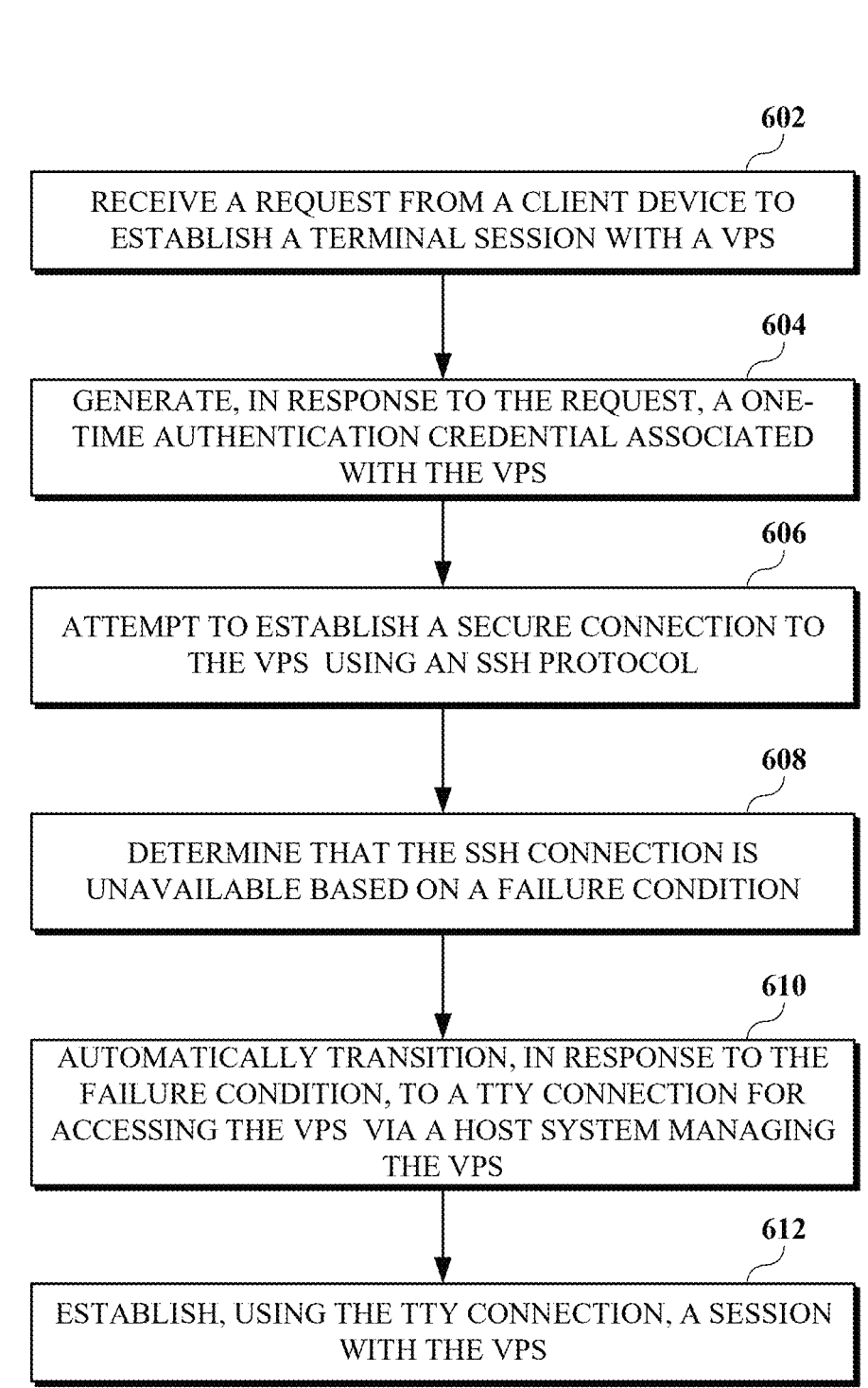

602

RECEIVE A REQUEST FROM A CLIENT DEVICE TO ESTABLISH A TERMINAL SESSION WITH A VPS

604

GENERATE, IN RESPONSE TO THE REQUEST, A ONE-TIME AUTHENTICATION CREDENTIAL ASSOCIATED WITH THE VPS

606

ATTEMPT TO ESTABLISH A SECURE CONNECTION TO THE VPS USING AN SSH PROTOCOL

608

DETERMINE THAT THE SSH CONNECTION IS UNAVAILABLE BASED ON A FAILURE CONDITION

610

AUTOMATICALLY TRANSITION, IN RESPONSE TO THE FAILURE CONDITION, TO A TTY CONNECTION FOR ACCESSING THE VPS VIA A HOST SYSTEM MANAGING THE VPS

612

ESTABLISH, USING THE TTY CONNECTION, A SESSION WITH THE VPS

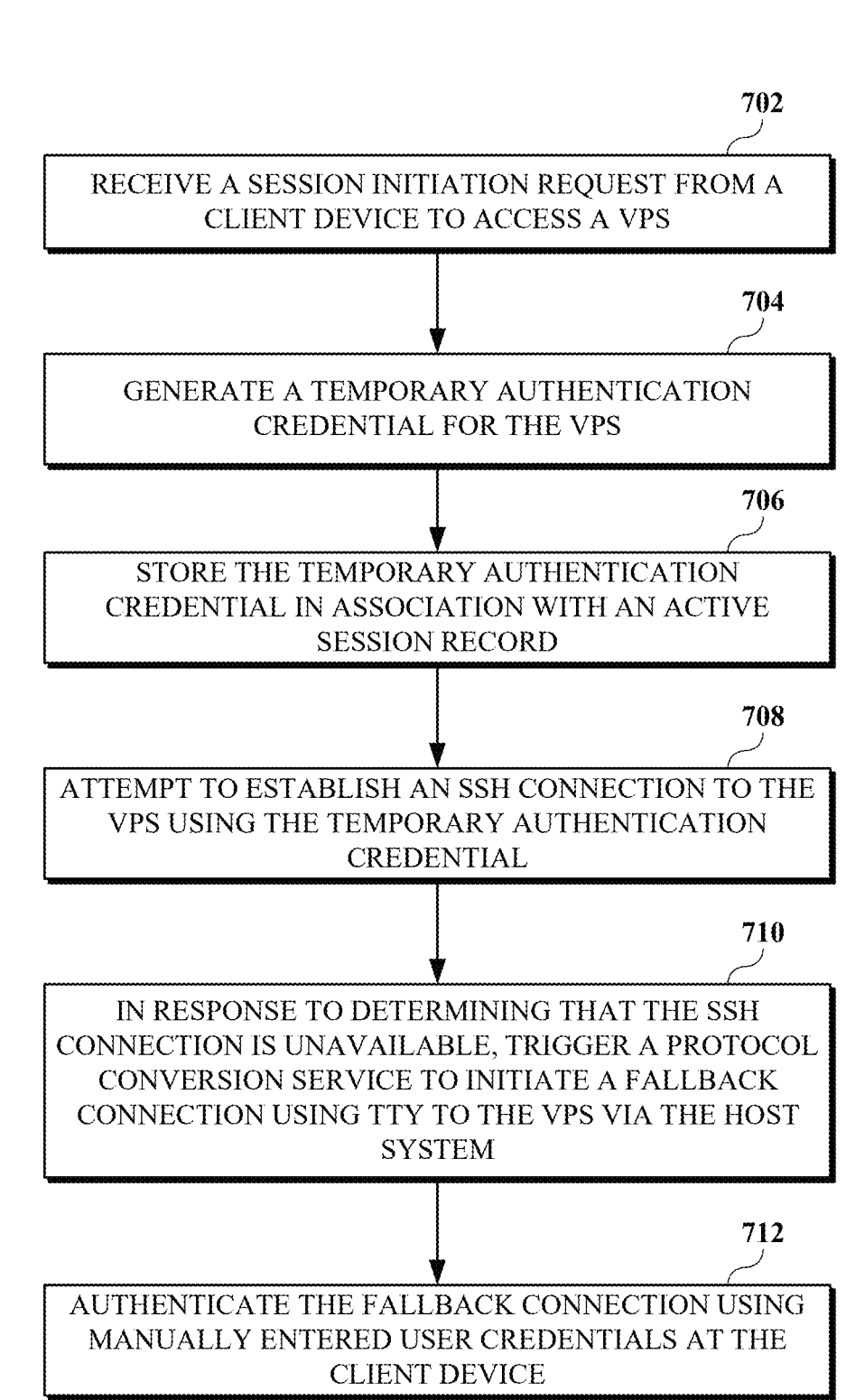

702

RECEIVE A SESSION INITIATION REQUEST FROM A CLIENT DEVICE TO ACCESS A VPS

704

GENERATE A TEMPORARY AUTHENTICATION CREDENTIAL FOR THE VPS

706

STORE THE TEMPORARY AUTHENTICATION CREDENTIAL IN ASSOCIATION WITH AN ACTIVE SESSION RECORD

708

ATTEMPT TO ESTABLISH AN SSH CONNECTION TO THE VPS USING THE TEMPORARY AUTHENTICATION CREDENTIAL

710

IN RESPONSE TO DETERMINING THAT THE SSH CONNECTION IS UNAVAILABLE, TRIGGER A PROTOCOL CONVERSION SERVICE TO INITIATE A FALLBACK CONNECTION USING TTY TO THE VPS VIA THE HOST SYSTEM

712

AUTHENTICATE THE FALLBACK CONNECTION USING MANUALLY ENTERED USER CREDENTIALS AT THE CLIENT DEVICE

FIG. 7

TERMINAL ACCESS TO VIRTUAL PRIVATE SERVERS WITH AUTOMATIC PROTOCOL FALLBACK

CROSS REFERENCE TO RELATED APPLICATIONS

This application is a continuation of U.S. patent application Ser. No. 19/086,600, filed Mar. 21, 2025, the entire disclosure of which is incorporated herein by reference.

FIELD

This disclosure generally relates to virtual private servers, and, more specifically, to terminal access to virtual private servers with automatic protocol fallback.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 5 is a flowchart of an example of a technique for establishing terminal connections with automatic protocol fallback.

FIG. 6 is a flowchart of another example of a technique for establishing terminal sessions with automatic protocol fallback.

FIG. 7 is a flowchart of an example of a technique for establishing secure terminal access to a VPS with an automatic fallback mechanism when Secure Shell (SSH) connectivity is unavailable.

DETAILED DESCRIPTION

Figure 1:
FIG. 1 is a block diagram of an example of a computing device.
Figure 1:
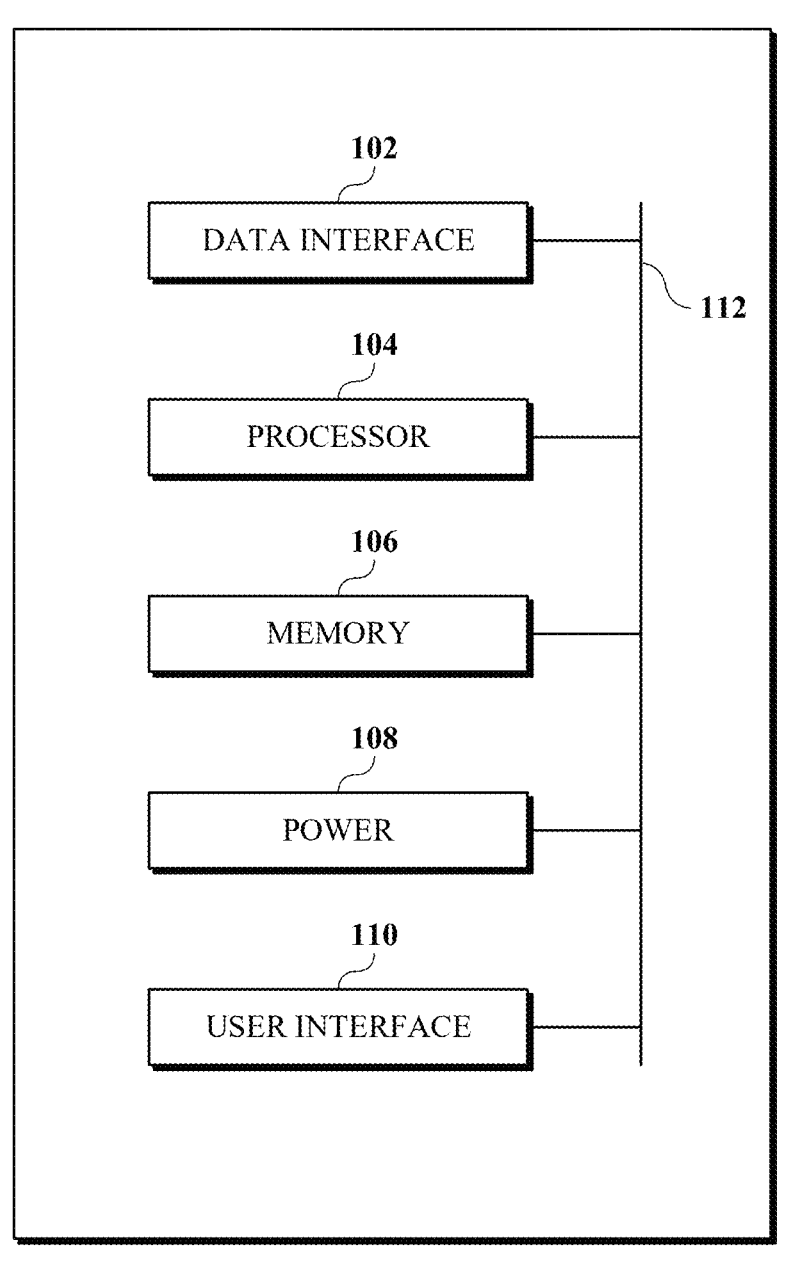

In modern computing environments, VPSs have become fundamental components, providing users with dedicated computing resources while maintaining cost efficiency and scalability. These VPSs are typically managed through remote access mechanisms, primarily via SSH, which enables users to configure, monitor, and troubleshoot their servers through encrypted connections. However, maintaining reliable access to a VPS can present significant technical challenges, particularly in scenarios where network misconfigurations, firewall settings, or SSH service failures prevent direct access. In such cases, users often face complete loss of server access, traditionally requiring manual recovery procedures, such as booting into rescue environments, modifying network configurations via external management consoles, or seeking administrative intervention. These methods introduce delays, operational inefficiencies, and security risks.

To enhance accessibility, VPS administrators often utilize browser-based terminal interfaces, which eliminate the need for separate SSH client software and allow direct command-line access via a web browser. While these solutions improve usability across different operating systems and devices, they are inherently dependent on SSH connectivity. If the VPS becomes network-inaccessible due to firewall rule misconfigurations, incorrect network interface settings, or SSH service failures, browser-based terminals become inoperable, leaving users without a means to access or recover their VPS. Current browser-based solutions lack a seamless fallback mechanism, forcing users to switch to alternative recovery methods that require separate login credentials, software tools, or administrative support.

Certain existing fallback solutions may employ Virtual Network Computing (VNC), a protocol that transmits framebuffer updates as bitmap images to provide emergency access. However, VNC-based approaches introduce several technical drawbacks, including high bandwidth consumption, increased latency, and usability constraints. Unlike text-based terminal access, VNC renders the terminal as an image, preventing essential text-based operations, such as copying and pasting commands. Additionally, switching between SSH and VNC (or any other fallback solution that may, for example, use a terminal protocol such as TTY) requires users to maintain multiple authentication credentials and manually transition between different management tools, creating a fragmented workflow that complicates troubleshooting and system recovery.

The lack of an integrated and automated access solution introduces operational inefficiencies and security challenges in VPS management, particularly in high-availability environments where minimal downtime is critical. The reliance on separate access mechanisms, each with distinct authentication methods and usability limitations, increases administrative overhead and complexity. An improved solution is needed to enable continuous access to VPS environments, regardless of network state or SSH service availability, thereby enhancing reliability, reducing downtime, and simplifying server administration.

Implementations according to this disclosure address problems such as these by providing a Unified Terminal Access Manager (UTERM) that selectively establishes either an SSH or a serial console (TTY) connection to maintain access to a VPS, regardless of network availability or SSH service status.

As used herein, "UTERM" refers to a VPS management service that coordinates with node-level services running on physical servers hosting multiple VPS instances. UTERM includes a protocol conversion service (also referred to herein as the "WebSSH" component) that manages communication between client interfaces and VPS instances. The node-level service handles SSH key management and VPS control operations, ensuring secure access provisioning and failover. As used herein, a "node-level service" refers to a software service executing on a physical server that hosts one or more VPS instances. The node-level service, implemented as the VPS control service described herein, manages local VPS operations including SSH key generation, network configuration, and secure access policy enforcement for all VPS instances on that physical server.

In one implementation, the client interface is a browser-based terminal that enables access through standard web browsers, eliminating the need for separate SSH client software. All references to terminal access management functionality in this disclosure are implemented through the UTERM system unless explicitly stated otherwise.

As used herein, "TTY" (teletypewriter) refers to a serial console connection that provides direct, text-based access to a VPS through the virtualization layer. While "TTY" and "serial console" are technically equivalent in the context of this disclosure, the term "TTY" will be used consistently throughout to refer to this fallback connection method that enables terminal access when SSH is unavailable.

The UTERM system enhances security and usability by generating secure, temporary authentication credentials and automatically transitioning to TTY-based access when SSH connectivity fails. Specifically, the UTERM generates one-time SSH keys and connection-specific tokens, thereby ensuring that each session is isolated and cannot be reused. Alternative embodiments may incorporate different authentication mechanisms (e.g., biometric-based access, multi-factor authentication), additional fallback protocols (e.g., RDP for Windows-based VPS), or extended client interfaces (e.g., Application programming interface (API)-based remote access tools), while maintaining the core functionality of seamless, secure, and uninterrupted VPS access.

To describe some implementations in greater detail, reference is first made to examples of hardware and software structures used to provide terminal access to virtual private servers with automatic protocol fallback. FIG. 1 is a block diagram of an example of a computing device 100. The computing device 100 may implement, execute, or perform, one or more aspects of the methods and techniques described herein. The computing device 100 includes a data interface 102, a processor 104, memory 106, a power component 108, a user interface 110, and a bus 112 (collectively, components of the computing device 100). Although shown as a distinct unit, one or more of the components of the computing device 100 may be integrated into respective distinct physical units. For example, the processor 104 may be integrated in a first physical unit and the user interface 110 may be integrated in a second physical unit. The computing device 100 may include aspects or components not expressly shown in FIG. 1, such as an enclosure or one or more sensors.

In some implementations, the computing device 100 is a stationary device, such as a personal computer (PC), a server, a workstation, a minicomputer, or a mainframe computer. In some implementations, the computing device 100 is a mobile device, such as a mobile telephone, a personal digital assistant (PDA), a laptop, or a tablet computer.

The data interface 102 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 102 may include, or may be, a transceiver. Although not shown separately in FIG. 1, the data interface 102 may include, or may be operatively coupled with, an antenna for wireless electronic communication. Although not shown separately in FIG. 1, the data interface 102 may include, or may be operatively coupled with, a wired electronic communication port, such as an Ethernet port, a serial port, or another wired port, that may interface with, or may be operatively coupled to, a wired electronic communication medium. In some implementations, the data interface 102 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 100, or one or more of the components thereof, and one or more external electronic or computing devices. Although shown as one unit in FIG. 1, the data interface 102 may include multiple physical components, such as a wired data interface and a wireless data interface.

For example, the computing device 100 may electronically communicate, such as transmit, receive, or exchange computer accessible data, with one or more other computing devices via one or more wired or wireless communications links, or connections, such as via a network, using the data interface 102, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 104 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 104 is implemented as a central processing unit (CPU), such as a microprocessor. In some implementations, the processor 104 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 104 includes one or more processing units. A processing unit may include one or more processing cores. The computing device 100 may include multiple physical or virtual processing units (collectively, the processor 104), which may be interconnected, such as via wired, or hard-wired, connections, via wireless connections, or via a combination of wired and wireless connections. In some implementations, the processor 104 is implemented in a distributed configuration including multiple physical devices or units that may be coupled directly or across a network. The processor 104 includes internal memory (not expressly shown), such as a cache, a buffer, a register, or a combination thereof, for internal storage of data, such as operative data, instructions, or both. For example, the processor 104 may read data from the memory 106 into the internal memory (not shown) for processing.

The memory 106 is a non-transitory computer-usable or computer-readable medium, implemented as a tangible device or component of a device. The memory 106 contains, stores, communicates, transports, or a combination thereof, data, such as operative data, instructions, or both. For example, the memory 106 stores an operating system of the computing device 100, or a portion thereof. The memory 106 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 106 may include non-volatile memory, such as a disk drive, or another form of non-volatile memory capable of persistent electronic data storage, such as in the absence of an active power supply. The memory 106 may include, or may be implemented as, one or more physical or logical units.

The memory 106 stores executable instructions or data, such as application data, an operating system, or a combination thereof, for access, such as read access, write access, or both, by the other components of the computing device 100, such as by the processor 104. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 106 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 108 obtains, stores, or both, power, or energy, used by the components of the computing device 100 to operate. The power component 108 may be implemented as a general-purpose alternating-current (AC) electric power supply, or as a power supply interface, such as an interface to a household power source or other external power distribution system. In some implementations, the power component 108 may be implemented as a single use battery or a rechargeable battery such that the computing device 100 operates, or partially operates, independently of an external power distribution system. For example, the power component 108 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 100.

The user interface 110 includes one or more units or devices for interfacing with an operator of the computing device 100, such as a human user. In some implementations, the user interface 110 obtains, receives, captures, detects, or otherwise accesses, data representing user input to the computing device, such as via physical interaction with the computing device 100. In some implementations, the user interface 110 outputs, presents, displays, or otherwise makes available, information, such as to an operator of the computing device 100, such as a human user. The user interface 110 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a user interface 110 may be omitted, or absent, from the computing device 100.

The bus 112 distributes or transports data, power, or both among the components of the computing device 100 such that the components of the computing device are operatively connected. Although the bus 112 is shown as one component in FIG. 1, the computing device 100 may include multiple busses, which may be connected, such as via bridges, controllers, or adapters. For example, the bus 112 may be implemented as, or may include, a data bus and a power bus. The execution, or performance, of instructions, programs, code, applications, or the like, to perform the methods and techniques described herein, or aspects or portions thereof, may include controlling, such as by sending electronic signals to, receiving electronic signals from, or both, the other components of the computing device 100.

Although not shown separately in FIG. 1, data interface 102, the power component 108, or the user interface 110 may include internal memory, such as an internal buffer or register.

Although an example of a configuration of the computing device 100 is shown in FIG. 1, other configurations may be used. One or more of the components of the computing device 100 shown in FIG. 1 may be omitted, or absent, from the computing device 100 or may be combined or integrated. For example, the memory 106, or a portion thereof, and the processor 104 may be combined, such as by using a system on a chip design.

Figure 2:
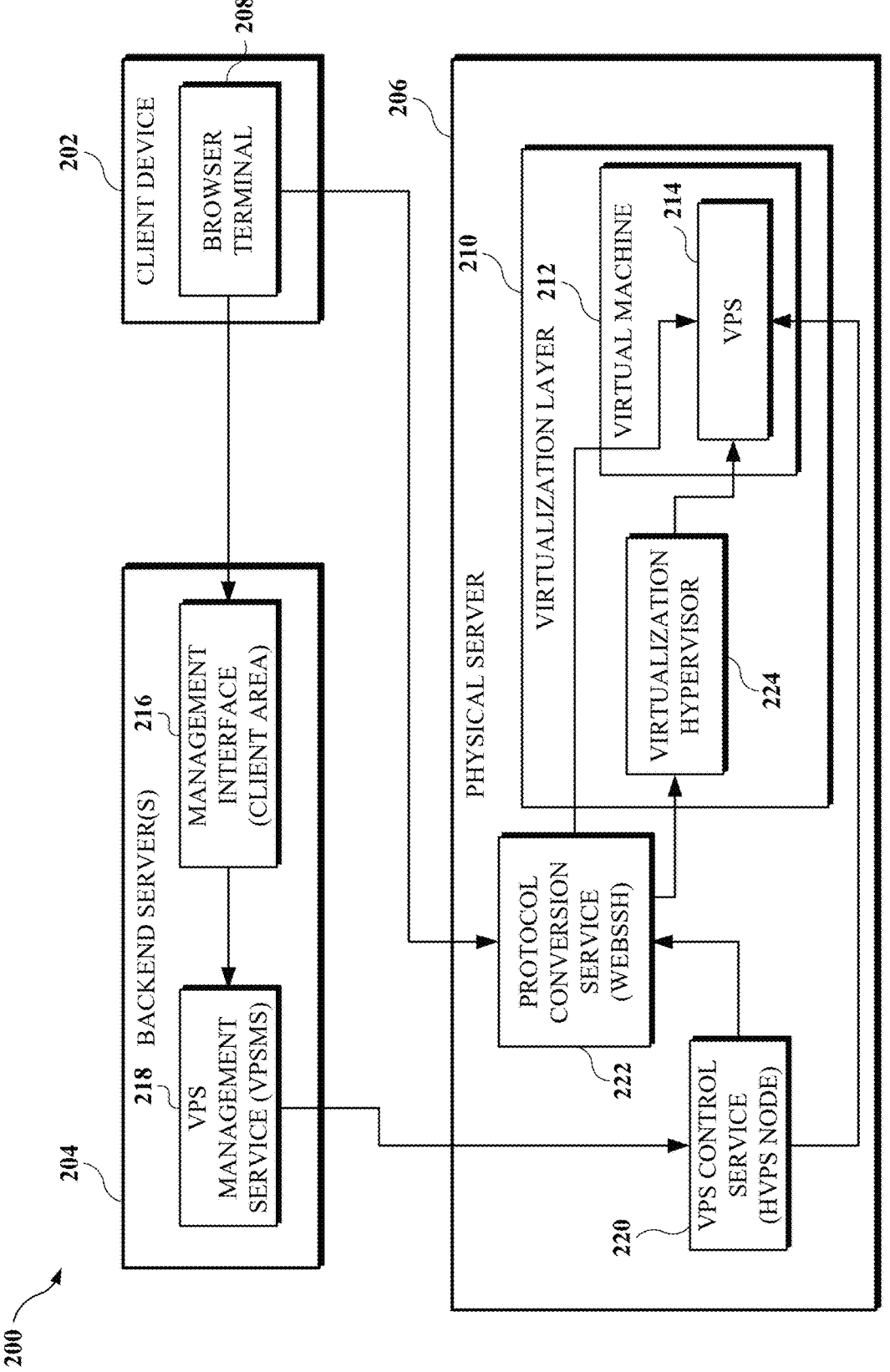
FIG. 2 is a block diagram of a system for providing unified terminal access to virtual private servers.

FIG. 2 is a block diagram of a system 200 for providing unified terminal access to virtual private servers. The unified terminal access is provided using automated protocol selection and secure authentication mechanisms. The system 200 includes a client device 202, backend server(s) 204, and a physical server 206. Different configurations are possible. For example, the backend server(s) 204 can be implemented as one or more computing devices, such as the computing device 100 of FIG. 1, and the components of the system 200 may be deployed across various computing environments, including cloud infrastructure, dedicated hardware, or hybrid configurations. Each of these components can be implemented using one or more computing devices, such as the computing device 100 of FIG. 1.

The client device 202 includes a browser terminal 208, which provides web-based access to VPS command-line interfaces through standard web browsers. The browser terminal 208 establishes secure connections to VPSs (i.e., VPS instances) without requiring separate SSH client software to be installed at the client device 202. The browser terminal 208 enables users of browser terminal 208 to copy and paste text to and from the terminal display, which is particularly valuable during system recovery scenarios where users need to quickly input complex commands or configuration strings. Alternative implementations may include dedicated desktop applications or mobile interfaces while maintaining the same automatic connection and protocol-switching capabilities.

The physical server 206 represents hardware infrastructure that hosts one or more VPS instances. The physical server 206 may provide high-performance computing resources with redundant components such as power supplies, network interfaces, and storage systems to ensure reliability. The physical server 206 may support multiple virtualization technologies and networking configurations, including advanced networking features for isolated VPS communications. Alternative implementations may utilize cloud infrastructure, bare metal servers, or hybrid hosting environments with distributed resource management.

The physical server 206 contains a virtualization layer 210, which provides the foundation for operating multiple isolated VPS instances. The virtualization layer 210 may utilize hypervisor technologies such as KVM, Xen, VMware ESXi, or Microsoft Hyper-V to manage resource allocation and hardware abstraction. The virtualization layer 210 may support both network-based and direct console access methods, providing flexible access options for different operational scenarios. Alternative implementations may incorporate container technologies, nested virtualization, or hybrid virtualization approaches combining multiple technologies.

Within the virtualization layer 210, each virtual machine 212 hosts a VPS instance (e.g., a VPS 214), providing an isolated computing environment with dedicated resources. The VPS 214 may run standard Linux distributions with configurable networking and security settings or some other operating system. The VPS environment may support both SSH services for normal operation and console access for recovery scenarios. The VPS instances may be provisioned with custom network configurations, encryption mechanisms, or containerized workloads to enhance security and performance. Alternative implementations may support various operating systems, implement custom security policies, or provide specialized software environments while maintaining compatibility with the unified access system.

The backend server(s) 204 includes a management interface 216, which provides a web-based control panel for VPS management. The management interface 216 may be accessed from, or displayed at, the client device 202 via a web browser. The management interface 216 may incorporate multi-factor authentication (MFA), role-based access control (RBAC), or other secure session management mechanisms to enhance administrative security. The management interface 216 enables authorized users to start, stop, configure, and monitor VPS instances (e.g., the VPS 214) through a graphical user interface (GUI) and an application programming interface (API). The management interface 216 may integrate with external access control lists (ACLs), single sign-on (SSO) systems, enterprise authentication protocols, or cloud identity management services to streamline access provisioning and user authentication.

A VPS management service (i.e., an VPSMS 218) operates within the backend server(s) 204 to coordinate operations between the management interface 216 and physical servers, such as the physical server 206. The VPSMS 218 may maintain records of VPS configurations, process terminal access requests, and manage authentication tokens (further described herein). The VPSMS 218 may process and validate terminal session requests, coordinate access control, and manage session authentication across multiple physical servers. Alternative implementations may incorporate distributed architectures, cloud-based coordination mechanisms, or enhanced security policy enforcement.

A VPS control service 220, deployed (e.g., executing) at the physical server 206, is configured to manage local VPS operations on the physical server 206. As further described herein, the VPS control service 220 may generate one-time SSH keys with automatic expiration, configure network settings, and enforce secure access policies.

The VPS control service 220 implements token-based authentication, which enables secure, session-based access without requiring persistent credentials. Token-based authentication involves generating a unique, time-limited token that serves as a temporary credential for authentication. The token may be embedded in an access Uniform Resource Locator (URL), included in an API request, or exchanged as part of a session handshake. Unlike traditional password-based authentication, token-based authentication, as described herein, enhances security by eliminating the need to store reusable passwords and by automatically expiring after a predefined time (e.g., one minute).

Additionally, the VPS control service 220 may implement automated security policies, such as firewall rule enforcement, SSH key rotation, and monitoring for unauthorized access attempts. The VPS control service 220 may integrate with intrusion detection systems (IDS), security information and event management (SIEM) tools, or other security monitoring platforms to log and analyze access patterns.

The VPS control service 220 may further enhance connection management by automatically detecting and storing VPS port configurations. Upon initialization of a VPS instance, the service scans common SSH configuration files (e.g., etc ssh sshd config) to identify configured ports and stores these in the connection database. This port configuration information can be used during connection attempts and enables the system 200 to correctly target SSH services running on non-standard ports. The stored port configuration is particularly valuable during failover scenarios, as it allows the system to verify SSH service availability across all configured ports before transitioning to TTY access.

A protocol conversion service 222 (also referred to herein as the WebSSH component) facilitates seamless communication between the browser terminal 208 and the VPS 214 using multiple access protocols. The protocol conversion service 222 may automatically select a TTY connection when an SSH connection is determined to be unavailable, manage authentication tokens, and handle secure protocol conversion. The protocol conversion service 222 may use various protocols for TTY access, such as IPMI Serial-over-LAN, Hypervisor Console Redirection, or alternative virtualization-based console access methods. Alternative implementations may support additional protocols, implement custom encryption schemes, or provide enhanced logging and monitoring capabilities.

The protocol conversion service 222 may work in conjunction with a port management subsystem that monitors and manages VPS port configurations. This subsystem maintains a real-time inventory of active ports and services for each VPS instance, enabling intelligent routing of connection attempts. The port management functionality may include automatic port detection, configuration validation, and port availability monitoring. When establishing connections, the protocol conversion service 222 uses this port configuration data to optimize connection attempts and rapidly identify service availability issues that may require failover to TTY access.

A virtualization hypervisor 224 directly manages virtual machine resources and provides low-level access control. The virtualization hypervisor 224 may handle CPU scheduling, memory allocation, and device emulation, providing local TTY access to the VPS 214 through the virtualization layer 210. As further described herein, this TTY access is proxied to the client device 202 via the protocol conversion service 222. In contrast, SSH access to the VPS 214 is supported independently of the virtualization hypervisor 224, utilizing a network connection stack to establish a direct connection between the client device 202 and the VPS 214.

The virtualization hypervisor 224 may provide secure console access when network connectivity is unavailable, enabling critical system recovery operations. The virtualization hypervisor 224 may be implemented using Type 1 (bare-metal) or Type 2 (hosted) architectures, supporting various operating systems and virtualization configurations. Alternative implementations may implement custom resource management algorithms, enhanced monitoring capabilities, or specialized access control mechanisms.

The system 200 enables a user, through the client device 202, to access and control a VPS 214 that operates within the virtualization layer 210 on the physical server 206. Such access may include executing commands, configuring system settings, or performing system recovery operations. The system 200 initially attempts to establish an SSH connection to the VPS 214, which provides encrypted communication and automatic authentication using one-time SSH keys, thus eliminating the need for manual credential entry. However, if the SSH connection cannot be established due, for example, to network misconfiguration, firewall restrictions or misconfigurations, or SSH service failures within the VPS 214, the system 200 seamlessly switches to a terminal (TTY) connection through the virtualization layer 210. While TTY connections require the user to manually enter VPS login credentials, they provide direct console access that remains available even when the VPS 214 is network-inaccessible. The system 200 provides this dual-protocol access through a browser-based interface without requiring installation of specialized terminal software on the client device 202.

As already mentioned, the VPS control service 220 may generate one-time SSH keys. An SSH key is a cryptographic key pair used for secure authentication in SSH connections. The key pair consists of a public key and a private key, where the public key is stored on the VPS 214 and the private key remains with the protocol conversion service 222. When a client device 202 initiates an SSH connection to the VPS 214, the VPS 214 verifies the private key against the stored public key, allowing for password-less, encrypted authentication. These authentication keys are distinct from session keys that may subsequently be negotiated between the browser terminal 208 and the management interface 216 for encrypting the actual data transmission. The VPS control service 220 may automatically generate and register a temporary SSH key pair for secure access, with the removal time of the key pair being configurable to enhance security and prevent unauthorized reuse. For example, the SSH keys may be removed from the VPS 214 after a 1-minute connection timeout if no connection is established. Additionally, session data (including the token, SSH public key, and connection details) are stored in a database and removed immediately once an SSH or TTY connection is established or the connection timeout is reached, whichever occurs first. This ensures that temporary credentials do not persist longer than necessary and cannot be reused for subsequent unauthorized access attempts.

The SSH key pair may be generated using a cryptographic algorithm. Any number of cryptographic algorithm are possible including, but limited to, Rivest-Shamir-Adleman (RSA), Elliptic Curve Digital Signature Algorithm (ECDSA), or Edwards-curve Digital Signature Algorithm (Ed25519). RSA is a widely-used public-key cryptosystem, ECDSA provides equivalent security with shorter key lengths by utilizing elliptic curve cryptography, and Ed25519 offers high performance and security with minimal key sizes through optimized elliptic curve operations.

The private SSH key of the SSH key pair is first created using a secure random number generator. A corresponding public key is then derived mathematically from the private key. The public key may be stored on the VPS, for example, in an authorized keys file, while the private key remains securely stored by the protocol conversion service 222.

The system 200 implements a seamless failover mechanism where, upon detecting SSH service unavailability, the protocol conversion service 222 automatically switches to TTY-based access through the virtualization hypervisor 224. This transition occurs without requiring user intervention or additional authentication steps, maintaining continuous access to the VPS even during network or service disruptions. The system may provide administrative tools for manual protocol selection, remote troubleshooting, or recovery actions in case of persistent access failures. The system may also maintain comprehensive logs of all authentication attempts and connection status changes for security auditing and compliance purposes.

The constituents (e.g., components) of the UTERM can be considered to be the management interface 216, the VPSMS 218, the VPS control service 220, and protocol conversion service 222. At least some of these constituents can be implemented as respective software programs that may be executed by one or more computing devices, such as the computing device 100 of FIG. 1. A software program can include machine-readable instructions that may be stored in a memory such as the memory 106 of FIG. 1, and that, when executed by a processor, such as processor 104 of FIG. 1, may cause the computing device to perform the instructions of the software program. In some implementations, the UTERM may not include one or more of the management interface 216, the VPSMS 218, and the VPS control service 220. When a constituent is not included in the UTERM, its essential functions for terminal access are distributed among and performed by the other constituents. That is, if a constituent is omitted from the UTERM implementation, its essential terminal access functions are allocated to and performed by one or more of the remaining constituents.

Figure 3A:
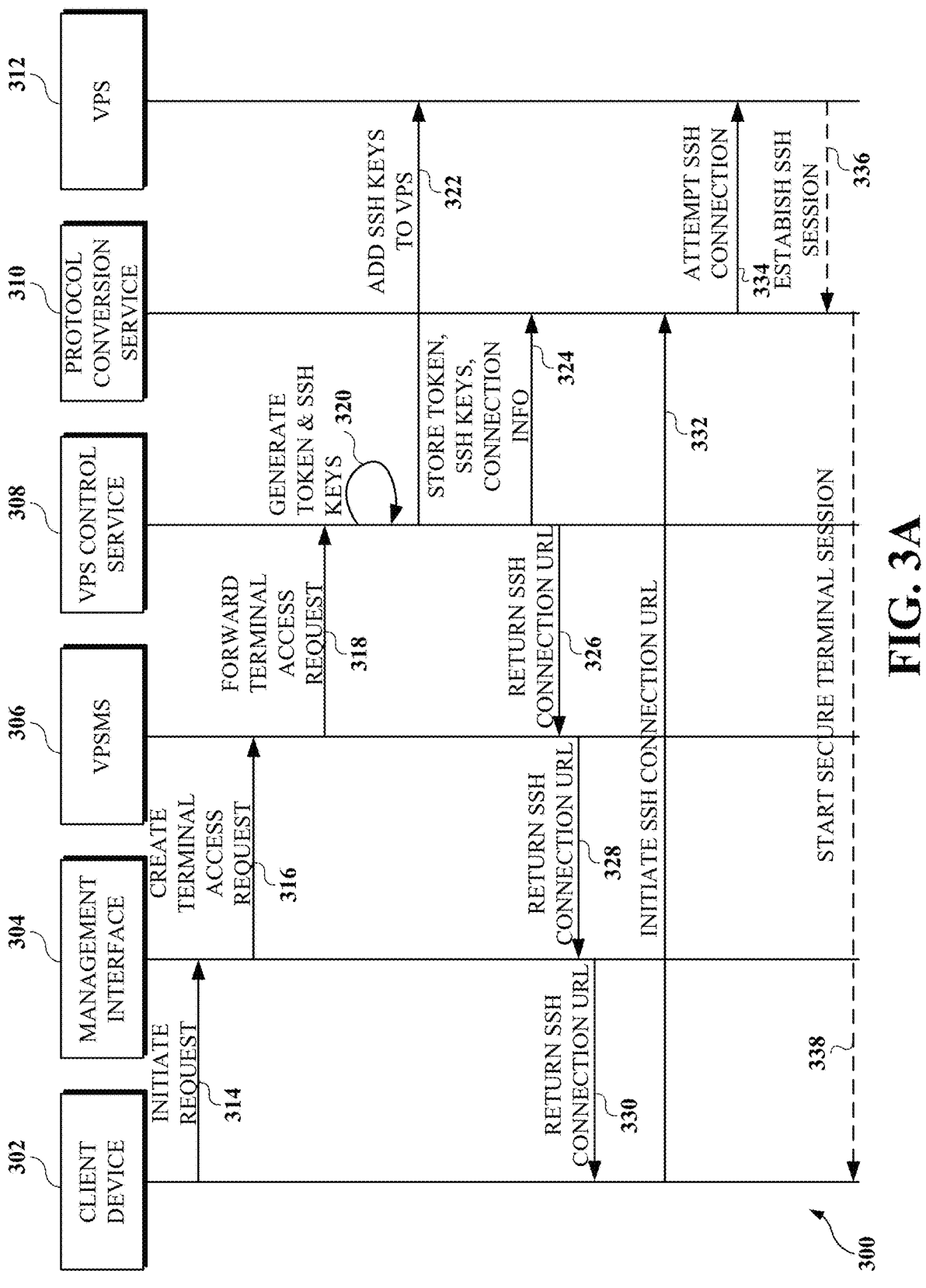
FIGS. 3A-3B illustrate an interaction diagram for establishing a communication session between a client device and a Virtual Private Server (VPS).
Figure 3B:
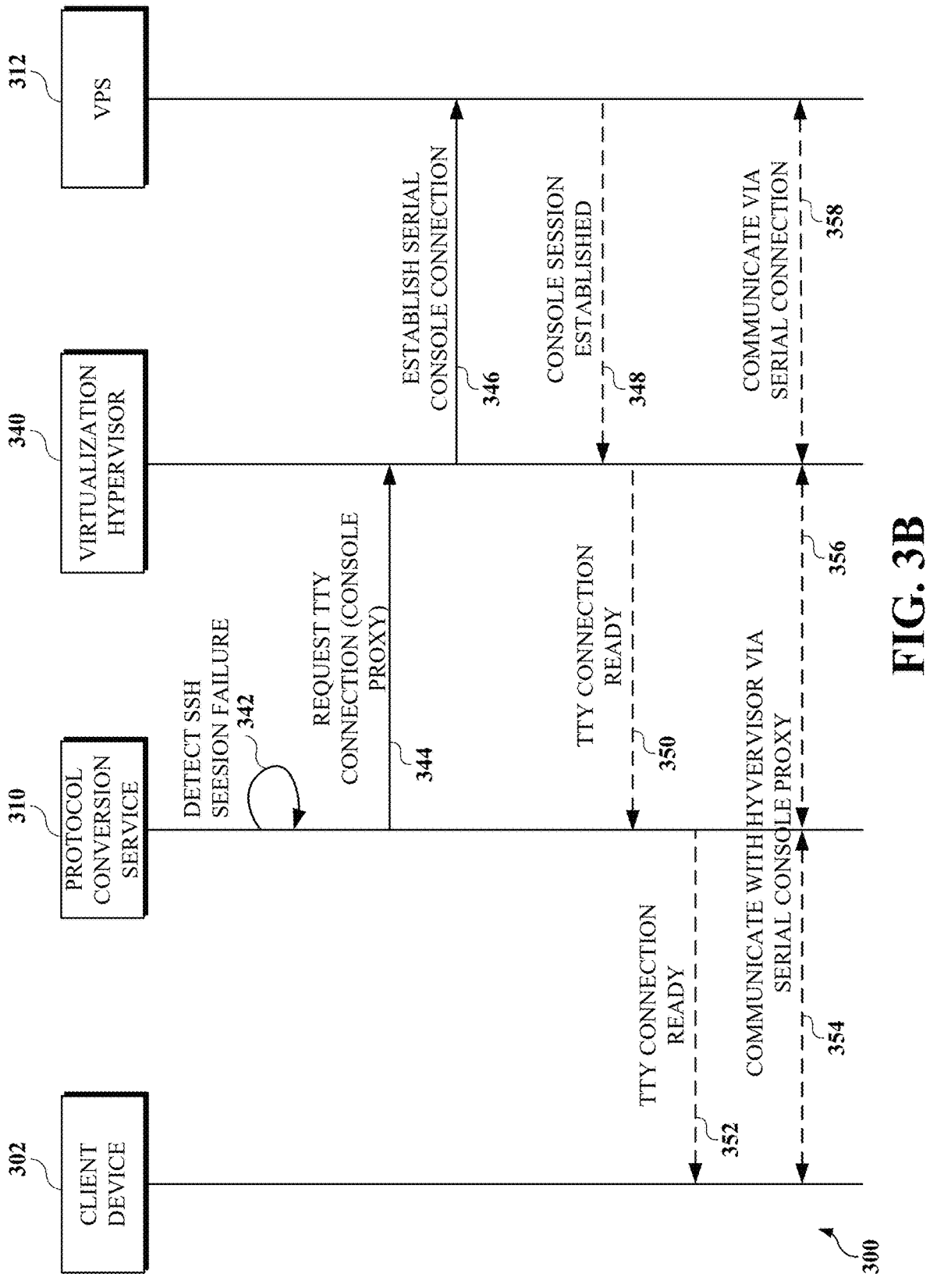

FIGS. 3A-3B illustrate an interaction diagram 300 for establishing a communication session between a client device and a VPS. The interaction diagram can be implemented by the system 200 of FIG. 2. At least some steps of the interaction diagram 300 can be implemented by one or more constituents of a UTERM. The interaction diagram 300 includes several components that correspond to elements of the system 200. A client device 302, a management interface 304, an VPSMS 306, a VPS control service 308, a protocol conversion service 310, a VPS 312, and a virtualization hypervisor 340 can be, respectively, the client device 202, the management interface 216, the VPSMS 218, the VPS control service 220, the protocol conversion service 222, the VPS 214, and the virtualization hypervisor 224 of FIG. 2.

FIG. 3A illustrates steps (interactions) for establishing a secure SSH connection between the client device 302 and the VPS 312. In some implementations, FIG. 3A represents the primary connection pathway when network connectivity and SSH services are functioning normally. FIG. 3B illustrates steps for establishing a TTY connection through a serial console when SSH connectivity cannot be established, providing a fallback mechanism for maintaining VPS access during network or service disruptions.

The interactions begin at step 314 where the client device 302 initiates a request to access the VPS 312. In some implementations, this request may be triggered by a user clicking a user interface control (e.g., "BROWSER TERMINAL" action button shown in FIG. 4A) within a web-based management interface displayed at the client device 302. The interaction diagram 300 assumes that the user has already authenticated to the management interface 304.

Because the user has already authenticated to the management interface 304, such as using two-step verification, prior to initiating the request, no additional credentials may be required from the user at this step. The existing session context within the management interface 304 provides the necessary authentication information.

At step 316, the management interface 304 creates a terminal access request in response to the initiation request. The terminal access request may include various parameters such as the target VPS identifier, user credentials, requested access level, and session preferences. In some implementations, the management interface 304 may perform preliminary validation checks, such as verifying user permissions or checking VPS availability. Alternative implementations may include additional request parameters, such as preferred connection protocol, timeout settings, or specific terminal configurations.

At step 318, the VPSMS 306 receives and processes the terminal access request, forwarding it to the VPS control service 308. The VPSMS 306 may serve as a microservice that manages all VPSs, while the VPS control service 308 operates as a subsystem running on the physical server hosting the target VPS (e.g., the VPS 312). In some implementations, the VPSMS 306 may identify the appropriate physical server hosting the VPS 312 and route the request accordingly. Alternative implementations may support different routing mechanisms or service architectures while maintaining the basic request forwarding functionality.

At step 320, the VPS control service 308 generates a token and SSH keys. The token is a randomly generated string that uniquely identifies the connection request and is used for session tracking and security verification. The token enables the protocol conversion service 310 to determine which VPS instance (e.g., the VPS 312) the user (e.g., the client device 302) is attempting to access and to perform authentication and security checks. In some implementations, the token may be embedded in the URL string used by the client device 302 to access the VPS. For example, a generated session URL may take the form: https://bnk.acme.com/1059/?token=ae4bd548e246f3a48961281ca07d70429. The VPS control service 308 may generate SSH key pairs using cryptographic protocols such as RSA, ECDSA, or Ed25519, with configurable key lengths and security parameters. Alternative implementations may employ additional security mechanisms, including time-based key expiration policies, IP restrictions, or multi-factor authentication.

At step 322, the VPS control service 308 adds the generated SSH keys to the VPS 312. This may include adding the public key to the an authorized keys (or an equivalent) file within the VPS environment. In some implementations, the VPS control service 308 may also configure key expiration (e.g., set to one minute) to ensure temporary keys are automatically removed. Alternative implementations may support different key deployment mechanisms, such as using configuration management tools or secure key distribution services.

At step 324, connection information including the generated token, SSH keys, and related metadata is stored by the VPS control service 308. The connection information may include an IP address, a port number, a timeout value, and/or protocol-specific configuration details. In some implementations, this connection information may be stored in a secure datastore (e.g., a file or a database) with encryption and access controls. Alternative implementations may support different storage mechanisms, such as distributed caches or secure key management systems.

While not explicitly shown in the interaction diagram 300 for brevity, the VPS control service 308 may initiate (e.g., configure) an automation task upon token generation to remove the corresponding SSH keys and token from the VPS 312 after a predefined token expiry period (e.g., one minute). As such, it will not be possible to establish a terminal session using these token and SSH keys after this predefined token expiry period. In some implementations, immediately upon successful connection, the SSH keys are removed to ensure no additional sessions can be initiated with that token. Once the terminal session is established, the token and SSH keys no longer serve a purpose and can be discarded (e.g., deleted) to prevent session hijacking or unauthorized reconnections. Thus, the automation task can also remove from storage the stored connection information.

Through steps 326, 328, and 330, the SSH connection URL is then returned through propagating from the VPS control service 308 back to the client device 302 through the VPSMS 306 and the management interface 304. The URL may include the generated token, connection parameters, and server identification information. In some implementations, the URL may be encrypted or signed to prevent tampering. Alternative implementations may support different URL formats or additional parameters for enhanced security or functionality.

At step 332, the SSH connection URL is used at the client device 302 to initiate an actual connection attempt. In some implementations, this may involve opening a new browser tab or window to establish the connection. The protocol conversion service 310 attempts to establish an SSH connection with the VPS 312 at step 334 using the previously generated credentials. Alternative implementations may support different connection initiation mechanisms or additional connection parameters.

Steps 336 and 338 represent the successful establishment of an SSH session and the start of a secure terminal session. During these steps, the protocol conversion service 310 acts as a converter between the SSH protocol and web browser supported data protocols. In operation, the protocol conversion service 310 may receive encrypted Hypertext Transfer Protocol Secure (HTTPS) requests from the client device 302, decrypt them, and pass the payload to the VPS 312. Similarly, the protocol conversion service 310 may receive plain text responses from the VPS 312, package them into HTTP response payloads, encrypt them, and transmit them back to the client device 302. The protocol conversion service 310 performs this bidirectional protocol conversion without modifying the actual terminal data content. Alternative implementations may support different protocol conversion mechanisms while maintaining the basic terminal data pass-through functionality.

FIG. 3B illustrates the failover scenario that occurs when SSH connectivity cannot be established. At step 342, the protocol conversion service 310 detects an SSH session failure. This detection may occur due to various conditions such as network connectivity issues, SSH service failures, or firewall restrictions. The SSH session failure can be detected at step 324 of FIG. 3A. In some implementations, the protocol conversion service 310 may attempt multiple SSH connection retries before initiating the failover process. Alternative implementations may support different failure detection mechanisms or retry policies.

At step 344, in response to detecting the failure to establish the SSH session, the protocol conversion service 310 requests a TTY connection through the virtualization hypervisor 340. At step 346, the virtualization hypervisor 340 establishes a serial console connection with the VPS 312. This connection provides direct console access inde-pendently of network connectivity or SSH service status. In some implementations, the virtualization hypervisor 340 may configure virtual console parameters such as terminal emulation type, buffer size, or character encoding. Alterna-tive implementations may support different console connec-tion mechanisms or additional configuration options.

At step 348, the console session establishment is con-firmed, with the TTY connection readiness propagated through steps 350 and 352 back to the client device 302. During these steps, the protocol conversion service 310 may perform necessary protocol translation and terminal emula-tion setup.

At steps 354, 356, and 358 communication proceeds through the serial console proxy, enabling continued access to the VPS 312 despite the SSH connection failure. The protocol conversion service 310 manages the translation between the browser-based terminal interface and the serial console protocol. In some implementations, the protocol conversion service 310 may provide additional features such as session recording, command logging, or terminal sharing capabilities. Alternative implementations may support dif-ferent proxy configurations or additional terminal features.

Figure 4A:
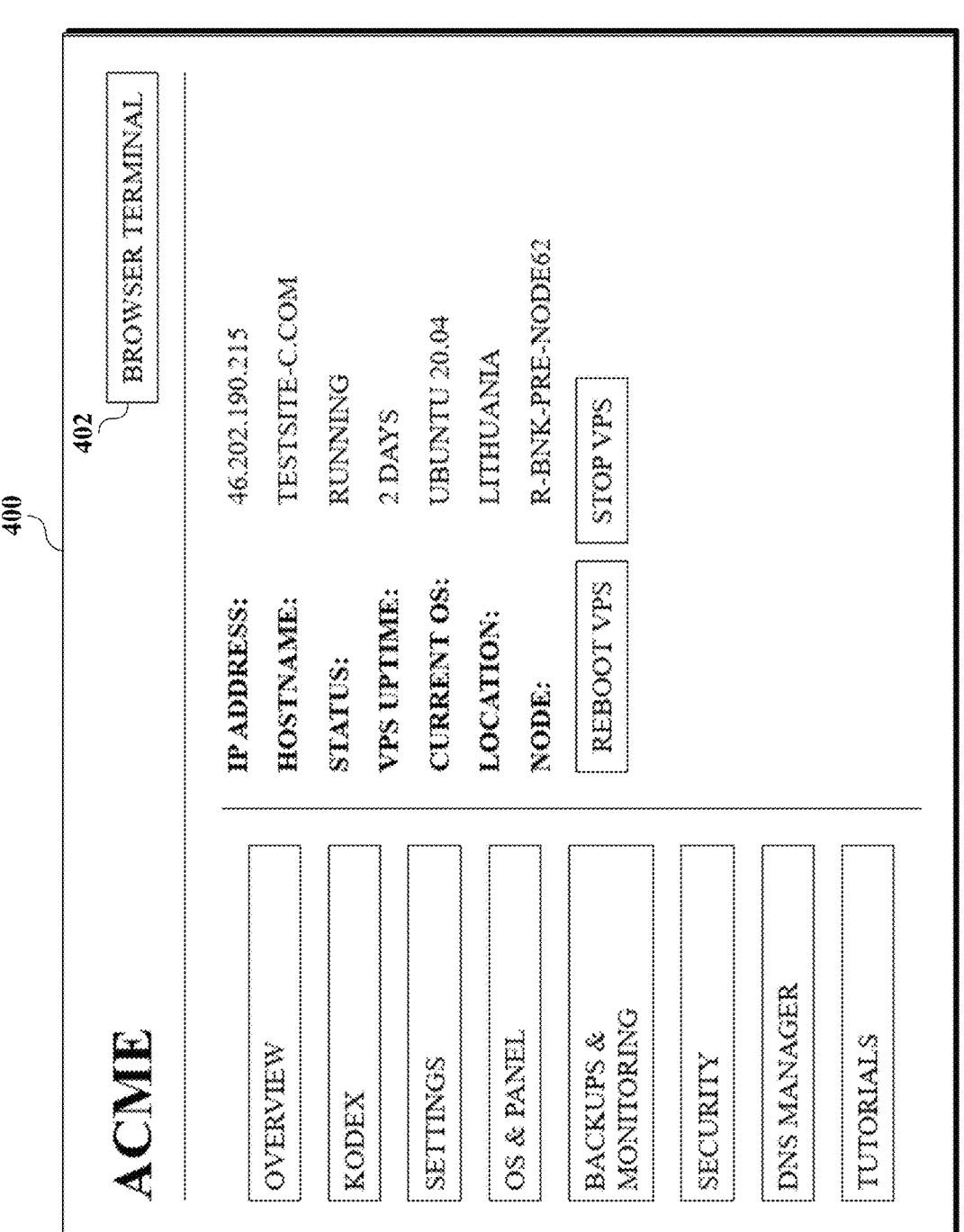
FIG. 4A illustrates a user interface that may be displayed at a client device.

FIG. 4A illustrates a user interface 400 that may be displayed at a client device, such as the client device 202 of FIG. 2 or the client device 302 of FIGS. 3A-3B. The user interface 400 can be displayed (e.g., caused to be displayed) by a management interface, such as those described with respect to FIGS. 2 and 3A-3B. The user interface 400 includes a user interface control 402 (e.g., an action button labeled "BROWSER TERMINAL") that, when clicked, causes the UTERM described with respect to FIG. 2 to initiate a terminal session with a VPS, such as the VPS 214 of FIG. 2 or the VPS 312 of FIGS. 3A-3B. The user interface 400 displays VPS information including an IP address, hostname, status, uptime, operating system version, physical location, and node identifier. In this example, and as shown in FIG. 4A, the VPS has the IP address of 46.202.190.215.

Figure 4B:
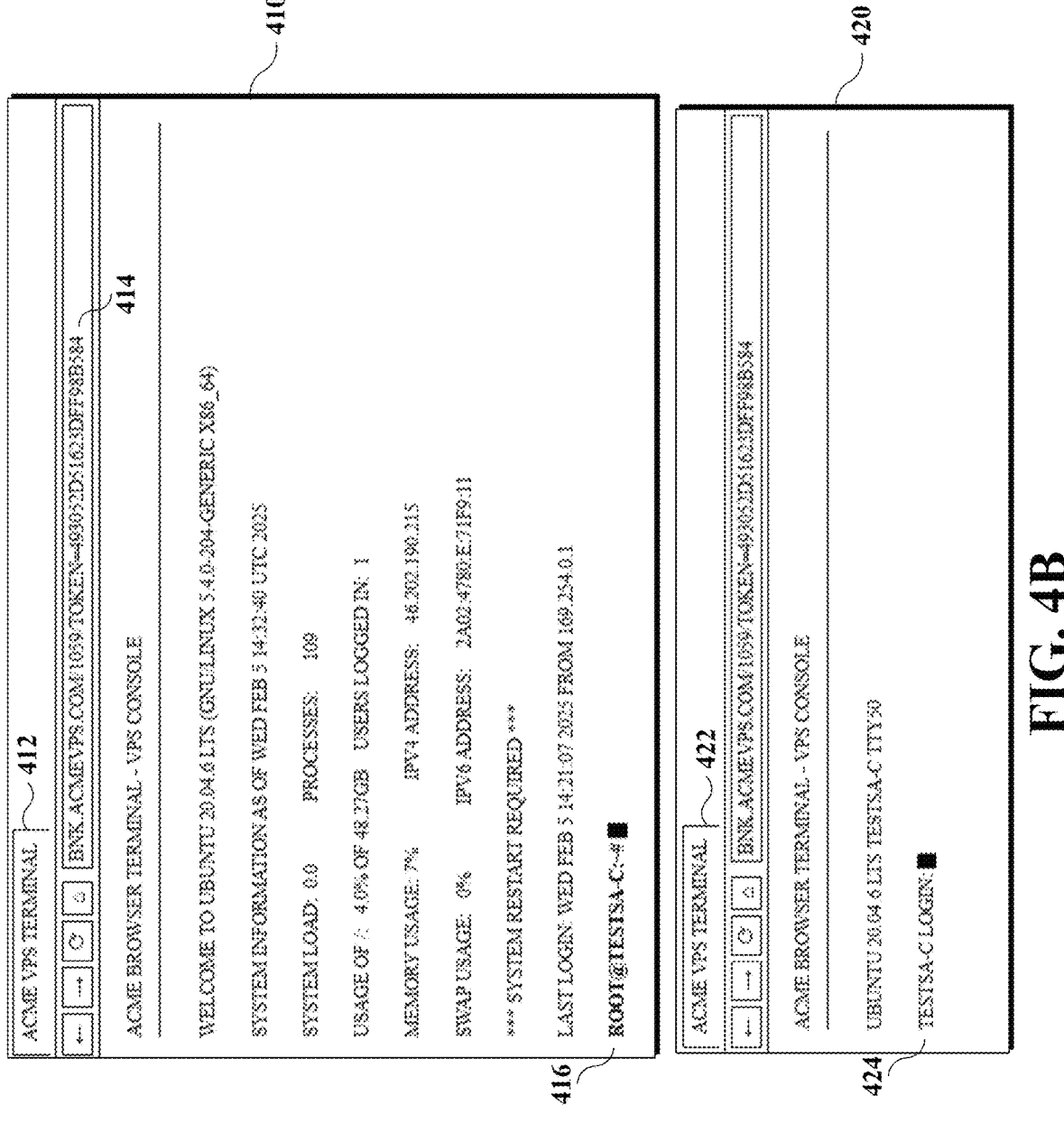
FIG. 4B illustrates two different terminal access scenarios.

FIG. 4B illustrates two different terminal access sce-narios. In a first scenario, when an SSH session can be established, a user interface 410 is displayed, such as in a browser tab 412 where an address bar 414 shows the one-time URL described herein. The user interface 410 illustrates that the user is not asked to provide credentials, as demonstrated by command line prompt 416 which shows direct root access ("ROOT@TESTSA-C:~#"). On the other hand, if an SSH session could not be established, then a user interface 420 illustrating a console interface is displayed. The user interface 420 is displayed in a browser tab 422. As described, in the case of the TTY protocol, the user is required to provide credentials, as indicated by a prompt 424 requesting "TESTSA-C LOGIN:" that the user first provide a username.

To further describe some implementations in greater detail, reference is next made to examples of techniques which may be performed by or using a system for providing unified terminal access to virtual private servers. FIG. 5 is a flowchart of an example of a technique 500 for establishing secure terminal connections with automatic protocol fall-back. The technique 500 can be executed using computing devices, such as the systems, hardware, and software described with respect to FIGS. 1-4B. The technique 500 can be performed, for example, by executing a machine-readable program or other computer-executable instructions, such as routines, instructions, programs, or other code. The steps, or operations, of the technique 500, or another technique, method, process, or algorithm described in connection with the implementations disclosed herein can be implemented directly in hardware, firmware, software executed by hard-ware, circuitry, or a combination thereof.

At 502, the technique 500 includes receiving, from a client device, a request to access a VPS. For example, the management interface 216 shown in FIG. 2 may receive the request through a VPS management interface that may require two-factor authentication. In some implementations, the request may be received at a connection management service implemented at a physical server hosting the VPS. The technique 500 may provide access to the VPS via a browser-based terminal interface that enables text copying and pasting functionality regardless of the connection type ultimately established.

Upon receiving the request, the technique 500 may gen-erate a one-time token and a temporary SSH key pair comprising a public key and a private key. The public key may be added to the VPS with an expiration time, while the private key and connection parameters for the VPS may be stored in association with the one-time token. In some implementations, the technique 500 may generate a URL incorporating the one-time token, where the URL may include a data center identifier indicating where the VPS is hosted, a node identifier indicating which physical server hosts the VPS, and the one-time token.

At 504, the technique 500 includes attempting to establish an SSH connection with the VPS. For example, the protocol conversion service 222 shown in FIG. 2 may attempt to establish the connection. Before attempting the connection, the technique 500 may detect a port configuration of the VPS and store the port configuration with connection parameters for establishing the SSH connection. In some implementa-tions, this may involve detecting a configuration file location on the VPS and reading port configuration information from the detected configuration file using a terminal command.

The one-time token may be generated as a randomly generated string of sufficient length to prevent guessing and associated with only a single connection session. The tech-nique 500 may set an expiration time for the one-time token and automatically invalidate it upon expiration. The tech-nique 500 may remove the SSH keys from the VPS imme-diately upon establishing a successful serial console con-nection. The technique 500 may automatically invalidate the one-time token after a predefined expiration period, wherein the predefined expiration period begins when the token is generated.

At 506, responsive to a failure to establish the SSH connection, the technique 500 includes automatically estab-lishing a serial console connection with the VPS. For example, as described in the interaction diagram 300 of FIGS. 3A-3B, the protocol conversion service 310 may detect a failure condition such as a network configuration error, a firewall restriction, or an SSH service failure and automatically transition to the serial console connection in response to the failure condition.

In some implementations, the serial console connection may be established through a hypervisor of the physical server hosting the VPS, specifically by accessing the VPS through internal virtualization hypervisor commands. The serial console connection may be established through a node-level service running on the physical server and may provide equivalent command-line functionality as the SSH connection.

At 508, the technique 500 includes converting data com-municated via the established connection to a format com-patible with the request. The data is translated to web browser-compatible data formats. For example, the protocol conversion service 222 shown in FIG. 2 may translate between SSH protocol data or TTY protocol data and web browser-compatible data formats. The connection may be managed through a service that determines connection type and converts communication protocols between the VPS and the client device.

At 510, the technique 500 includes providing the converted data to the client device. In some implementations, the system may provide automatic root-level access for authorized users without requiring manual credential entry. However, for shared user accounts, the technique 500 may generate authentication credentials and require manual credential entry.

The technique 500 may maintain a database of active connections and enforce unique session identifiers for each active connection. This may involve generating a session identifier, associating the session identifier with connection parameters, and invalidating the session identifier upon session termination.

Alternative implementations may include variations in the specific sequence of operations shown in FIG. 5. For example, the token validation and authentication steps may be performed at different points in the process, or multiple fallback protocols beyond TTY may be attempted before establishing the final connection. Additionally, different types of authentication mechanisms may be employed, such as biometric authentication or hardware security keys, while maintaining the basic flow of establishing secure connections with automatic protocol fallback.

FIG. 6 is a flowchart of an example of a technique 600 for establishing terminal sessions with automatic protocol fallback. The technique 600 can be executed using computing devices, such as the systems, hardware, and software described with respect to FIGS. 1-4B. The technique 600 can be performed, for example, by executing a machine-readable program or other computer-executable instructions, such as routines, instructions, programs, or other code. The steps, or operations, of the technique 600, or another technique, method, process, or algorithm described in connection with the implementations disclosed herein can be implemented directly in hardware, firmware, software executed by hardware, circuitry, or a combination thereof.

At 602, the technique 600 includes receiving a request from a client device to establish a terminal session with a VPS. For example, the management interface 216 shown in FIG. 2 may receive the request through a browser-based terminal interface that enables access without requiring manual protocol switching by users. In some implementations, this request may be initiated through the interface shown in FIG. 4A by clicking the "BROWSER TERMINAL" button.

At 604, the technique 600 includes generating, in response to the request, a one-time authentication credential associated with the VPS. For example, as described with respect to step 320 of FIG. 3A, the VPS control service may generate authentication credentials such as temporary SSH keys and connection-specific tokens. In some implementations, these credentials may be configured with automatic expiration to enhance security.

At 606, the technique 600 includes attempting to establish a secure connection to the VPS using an SSH protocol. For example, as described in relation to steps 332-338 of FIG. 3A, the protocol conversion service may attempt to establish an SSH session using the generated credentials. In some implementations, this attempt may involve multiple connection retries before determining a failure condition. At 608, the technique 600 includes determining that the SSH connection is unavailable based on a failure condition. For example, as described in relation to step 342 of FIG. 3B, the protocol conversion service may detect various failure conditions such as network connectivity issues, SSH service failures, or firewall restrictions. In some implementations, the system may perform diagnostic checks to identify the specific nature of the failure condition.

At 610, in response to the failure condition, the technique 600 automatically transitions to a TTY connection for accessing the VPS via a host system managing the VPS. For example, as described in relation to steps 344-346 of FIG. 3B, the technique 600 may establish a serial console connection through the virtualization hypervisor. This transition occurs transparently to the user, maintaining the same browser-based interface throughout the protocol switch. At 612, the technique 600 includes establishing, using the TTY connection, a session with the VPS. The session is established using manual credential entry. For example, as described in relation to steps 354-358 of FIG. 3B and illustrated in FIG. 4B, the user must provide standard login credentials (username/password) when accessing the VPS via TTY connection. This differs from SSH access, which uses the previously generated one-time credentials. For example, as described in relation to steps 354-358 of FIG. 3B, the protocol conversion service may manage the translation between the browser-based terminal interface and the serial console protocol to maintain a seamless user experience.

Alternative implementations may include additional steps between those shown in FIG. 6. For example, the system may implement additional security checks before the protocol transition, verify user permissions for TTY access, or attempt alternative connection protocols before falling back to TTY. The system may also support different types of terminal protocols beyond TTY for fallback scenarios, such as Remote Desktop Protocol (RDP) for Windows-based VPS instances.

FIG. 7 is a flowchart of an example of a technique 700 for establishing secure terminal access to a VPS with an automatic fallback mechanism when SSH connectivity is unavailable. The technique 700 can be executed using computing devices, such as the systems, hardware, and software described with respect to FIGS. 1-4B. The technique 700 can be performed, for example, by executing a machine-readable program or other computer-executable instructions, such as routines, instructions, programs, or other code. The steps or operations of the technique 700, or another technique, method, process, or algorithm described in connection with the implementations disclosed herein, can be implemented directly in hardware, firmware, software executed by hardware, circuitry, or a combination thereof.

FIG. 7 is a flowchart of an example of a technique 700 for establishing secure terminal access to a VPS with an automatic fallback mechanism when SSH connectivity is unavailable. The technique 700 can be executed using computing devices, such as the systems, hardware, and software described with respect to FIGS. 1-4B. The technique 700 can be performed, for example, by executing a machine-readable program or other computer-executable instructions, such as routines, instructions, programs, or other code. The steps or operations of the technique 700, or another technique, method, process, or algorithm described in connection with the implementations disclosed herein, can be implemented directly in hardware, firmware, software executed by hardware, circuitry, or a combination thereof.

At 702, the technique 700 includes receiving, from a client device, a session initiation request to access a VPS. For example, the management interface 216 of FIG. 2 may receive this request through a browser-based terminal interface that enables remote access to the VPS. At 704, the technique 700 includes generating a temporary authentication credential for the VPS. In some implementations, this temporary authentication credential comprises a one-time token and a temporary SSH key pair, ensuring secure authentication without requiring static passwords.

At 706, the technique 700 includes storing the temporary authentication credential in association with an active session record. The session record may include connection parameters such as the VPS identifier, user session metadata, and the expiration time of the authentication credential. At 708, the technique 700 includes attempting to establish an SSH connection to the VPS using the temporary authentication credential. This connection attempt may involve detecting the appropriate network settings and using the generated SSH key pair for authentication.

At 710, in response to determining that the SSH connection is unavailable, the technique 700 includes triggering a protocol conversion service to initiate a fallback connection using a terminal protocol (TTY) to the VPS via the host system. The protocol conversion service may detect SSH connection failures due to network misconfigurations, firewall restrictions, or service outages and seamlessly switch to a serial console connection using a hypervisor. At 712, the technique 700 includes authenticating the fallback connection using manually entered user credentials at the client device. Unlike the SSH-based connection, which utilizes the temporary authentication credential, the fallback TTY connection requires the user to manually enter a username and password to access the VPS.

For simplicity of explanation, the techniques 500, 600, and 700 of FIGS. 5, 6, and 7, respectively, is each depicted and described herein as a series of steps or operations. However, the steps or operations of these and other techniques that are in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Some implementations are described below as numbered examples (Example 1, 2, 3, etc.). These examples are provided as examples only and do not limit the other implementations disclosed herein.

Example 1 is a method that includes receiving, from a client device, a request to access a Virtual Private Server (VPS); attempting to establish a Secure Shell (SSH) connection with the VPS; responsive to a failure to establish the SSH connection, automatically establishing a serial console connection with the VPS; converting data communicated via the serial console connection to a format compatible with the request; and providing the converted data to the client device.

Example 2 is the method of Example 1 further including: generating a one-time token and a temporary SSH key pair including a public key and a private key; and adding the public key to the VPS with an expiration time.

Example 3 is the method of Example 2 further including: storing the SSH key pair and connection parameters for the VPS in association with the one-time token; and removing the public key from the VPS after the expiration time.

Example 4 is the method of Example 3 further including: removing the SSH key pair from the VPS immediately upon establishing the serial console connection; and automatically invalidating the one-time token after a predefined expiration period, where the predefined expiration period begins when the token is generated.

Example 5 is the method of Example 1 further including: generating a Uniform Resource Locator (URL) incorporating a one-time token; and establishing the SSH connection or the serial console connection only upon receiving the one-time token via the URL.

Example 6 is the method of Example 5 further including: storing the one-time token and connection parameters for the VPS; and validating a token received from the client device against the one-time token.

Example 7 is the method of Example 1 further including: providing access to the VPS via a browser-based terminal interface; and enabling text copying and pasting functionality regardless of whether the SSH connection or the serial console connection is established.

Example 8 is a system that includes a memory subsystem and processing circuitry, the processing circuitry configured to execute instructions stored in the memory subsystem to: receive, from a client device, a request to access a Virtual Private Server (VPS); attempt to establish a Secure Shell (SSH) connection with the VPS; responsive to a failure to establish the SSH connection, automatically establish a serial console connection with the VPS; convert data communicated via the serial console connection to a format compatible with the request; and provide the converted data to the client device.

Example 9 is the system of Example 8 where the failure to establish the SSH connection includes at least one of a network configuration error, a firewall restriction, or an SSH service failure.

Example 10 is the system of Example 8 where the serial console connection is established through a hypervisor of a physical server hosting the VPS.

Example 11 is the system of Example 8 where the processing circuitry further configured to execute instructions stored in the memory subsystem to: detect a port configuration of the VPS; and store the port configuration with connection parameters for establishing the SSH connection.

Example 12 is the system of Example 8 where automatically establishing the serial console connection includes accessing the VPS through internal virtualization hypervisor commands.

Example 13 is the system of Example 8 where the processing circuitry further configured to execute instructions stored in the memory subsystem to: determine a failure condition of the SSH connection; and automatically transition to the serial console connection in response to the failure condition.

Example 14 is the system of Example 8 where the processing circuitry further configured to execute instructions stored in the memory subsystem to: establish the serial console connection through a node-level service running on a physical server; and manage the connection through a service that determines connection type and converts communication protocols between the VPS and the client device.

Example 15 is one or more non-transitory computer readable media storing instructions operable to cause one or more processors to perform operations including: receiving, from a client device, a request to access a Virtual Private Server (VPS); attempting to establish a Secure Shell (SSH) connection with the VPS; responsive to a failure to establish the SSH connection, automatically establishing a serial console connection with the VPS; converting data communicated via the serial console connection to a format compatible with the request; and providing the converted data to the client device.

Example 16 is the one or more non-transitory computer readable media of Example 15, the operations further including: generating a one-time token and a temporary SSH key pair including a public key and a private key; and adding the public key to the VPS with an expiration time.

Example 17 is the one or more non-transitory computer readable media of Example 16, the operations further including: storing the private key and connection parameters for the VPS in association with the one-time token; and removing the public key from the VPS after the expiration time.

Example 18 is the one or more non-transitory computer readable media of Example 15, the operations further including: detecting a configuration file location on the VPS; and reading port configuration information from the detected configuration file using a terminal command.

Example 19 is the one or more non-transitory computer readable media of Example 15, the operations further including: generating a session identifier; associating the session identifier with connection parameters; and invalidating the session identifier upon session termination.

Example 20 is the one or more non-transitory computer readable media of Example 15 where the serial console connection is established through a hypervisor of a physical server hosting the VPS.

Unless expressly stated, or otherwise clear from context, the terminology "computer," and variations or wordforms thereof, such as "computing device," "computing machine," "computing and communications device," and "computing unit," indicates a "computing device," such as the computing device 100 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium and, collectively, one or more non-transitory computer readable media. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein.

Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:

receiving, from a client device, a request to access a Virtual Private Server (VPS);

initiating an actual connection attempt to establish a Secure Shell (SSH) connection with the VPS;

responsive to a failure to establish the SSH connection, automatically establishing a serial console connection with the VPS, wherein a transition from the SSH connection to the serial console connection occurs transparently to a user of the client device while maintaining a same terminal interface for the serial console connection, and wherein the terminal interface used by the user to initiate the request to access the VPS is the same terminal interface maintained throughout the serial console connection;

converting data communicated via the serial console connection to a format compatible with the request; and providing the converted data to the client device.

2. The method of claim 1, further comprising:

generating a one-time token and a temporary SSH key pair comprising a public key and a private key; and adding the public key to the VPS with an expiration time.

3. The method of claim 2, further comprising:

storing the SSH key pair and connection parameters for the VPS in association with the one-time token; and removing the public key from the VPS after the expiration time.

4. The method of claim 3, further comprising:

removing the SSH key pair from the VPS immediately upon establishing the serial console connection; and automatically invalidating the one-time token after a predefined expiration period, wherein the predefined expiration period begins when the token is generated.

5. The method of claim 1, further comprising:

generating a Uniform Resource Locator (URL) incorporating a one-time token; and establishing the SSH connection or the serial console connection only upon receiving the one-time token via the URL.

6. The method of claim 5, further comprising:

storing the one-time token and connection parameters for the VPS; and validating a token received from the client device against the one-time token.

7. The method of claim 1, further comprising:

providing access to the VPS via a browser-based terminal interface; and enabling text copying and pasting functionality regardless of whether the SSH connection or the serial console connection is established.

8. A system, comprising:

a memory subsystem; and processing circuitry, the processing circuitry configured to execute instructions stored in the memory subsystem to:

receive, from a client device, a request to access a Virtual Private Server (VPS);

initiate an actual connection attempt to establish a Secure Shell (SSH) connection with the VPS;

responsive to a failure to establish the SSH connection, automatically establish a serial console connection with the VPS, wherein a transition from the SSH connection to the serial console connection occurs transparently to a user of the client device while maintaining a same terminal interface for the serial console connection, and wherein the terminal interface used by the user to initiate the request to access the VPS is the same terminal interface maintained throughout the serial console connection;

convert data communicated via the serial console connection to a format compatible with the request; and provide the converted data to the client device.

9. The system of claim 8, wherein the failure to establish the SSH connection comprises at least one of a network configuration error, a firewall restriction, or an SSH service failure.

10. The system of claim 8, wherein the serial console connection is established through a hypervisor of a physical server hosting the VPS.

11. The system of claim 8, wherein the processing circuitry further configured to execute instructions stored in the memory subsystem to:

detect a port configuration of the VPS; and store the port configuration with connection parameters for establishing the SSH connection.

12. The system of claim 8, wherein automatically establishing the serial console connection comprises accessing the VPS through internal virtualization hypervisor commands.

13. The system of claim 8, wherein the processing circuitry further configured to execute instructions stored in the memory subsystem to:

determine a failure condition of the SSH connection; and automatically transition to the serial console connection in response to the failure condition.

14. The system of claim 8, wherein the processing circuitry further configured to execute instructions stored in the memory subsystem to:

establish the serial console connection through a node-level service running on a physical server; and manage the connection through a service that determines connection type and converts communication protocols between the VPS and the client device.

15. One or more non-transitory computer readable media storing instructions operable to cause one or more processors to perform operations comprising:

receiving, from a client device, a request to access a Virtual Private Server (VPS);

initiating an actual connection attempt to establish a Secure Shell (SSH) connection with the VPS;

responsive to a failure to establish the SSH connection, automatically establishing a serial console connection with the VPS, wherein a transition from the SSH connection to the serial console connection occurs transparently to a user of the client device while maintaining a same terminal interface for the serial console connection, and wherein the terminal interface used by the user to initiate the request to access the VPS is the same terminal interface maintained throughout the serial console connection;

converting data communicated via the serial console connection to a format compatible with the request; and providing the converted data to the client device.

16. The one or more non-transitory computer readable media of claim 15, the operations further comprising:

generating a one-time token and a temporary SSH key pair comprising a public key and a private key; and adding the public key to the VPS with an expiration time.

17. The one or more non-transitory computer readable media of claim 16, the operations further comprising:

storing connection parameters for the VPS and the private key in association with the one-time token; and removing the public key from the VPS after the expiration time.

18. The one or more non-transitory computer readable media of claim 15, the operations further comprising:

detecting a configuration file location on the VPS; and reading port configuration information from the detected configuration file using a terminal command.

19. The one or more non-transitory computer readable media of claim 15, the operations further comprising:

generating a session identifier;

associating the session identifier with connection parameters; and invalidating the session identifier upon session termination.

20. The one or more non-transitory computer readable media of claim 15, wherein the serial console connection is established through a hypervisor of a physical server hosting the VPS.

* * * * *